(12) United States Patent
Shafrir

(10) Patent No.: US 6,953,344 B2
(45) Date of Patent: Oct. 11, 2005

(54) MEANING EQUIVALENCE INSTRUCTIONAL METHODOLOGY (MEIM)

(76) Inventor: Uri Shafrir, 5 Hahn Place, Suite 307, Toronto, Ontario (CA), M5A 4G1

( * ) Notice: Subject to any disclaimer, the term of this patent is extended or adjusted under 35 U.S.C. 154(b) by 394 days.

(21) Appl. No.: 10/156,863

(22) Filed: May 30, 2002

(65) Prior Publication Data
US 2002/0192629 A1 Dec. 19, 2002

Related U.S. Application Data

(60) Provisional application No. 60/294,012, filed on May 30, 2001.

(51) Int. Cl.[7] ................................................ G09B 9/00
(52) U.S. Cl. ....................................... 434/323; 434/353
(58) Field of Search ............................ 434/118, 307 R, 434/322, 323, 350–353, 362, 167–169

(56) References Cited

U.S. PATENT DOCUMENTS

| | | | | |
|---|---|---|---|---|
| 5,407,357 A | * | 4/1995 | Cutler | 434/335 |
| 5,456,607 A | * | 10/1995 | Antoniak | 434/323 |
| 5,718,589 A | | 2/1998 | McCracken et al. | |
| 5,820,386 A | * | 10/1998 | Sheppard, II | 434/322 |
| 5,827,071 A | | 10/1998 | Sorensen et al. | |
| 5,934,910 A | | 8/1999 | Ho et al. | |
| 5,987,443 A | | 11/1999 | Nichols et al. | |
| 6,023,691 A | | 2/2000 | Bertrand et al. | |
| 6,073,127 A | | 6/2000 | Lannert et al. | |
| 6,112,049 A | * | 8/2000 | Sonnenfeld | 434/350 |
| 6,206,374 B1 | | 3/2001 | Jones | |
| 6,299,452 B1 | * | 10/2001 | Wasowicz et al. | 434/178 |
| 6,343,935 B1 | * | 2/2002 | Clements | 434/156 |
| 6,361,322 B1 | * | 3/2002 | Linden Henry | 434/178 |
| 6,688,889 B2 | * | 2/2004 | Wallace et al. | 434/322 |

OTHER PUBLICATIONS

Royer, J.M., "The Sentence Verification Technique: A new direction in the assessment of reading comprehension." In S.M. Legg and J. Algina (Eds.), Cognitive assessment of language and math outcomes, 1990, pp. 144–191, Norwood, NJ: Ablex.

Royer, J.M., "Cognitive perspective on the assessment, diagnosis, and remediation of reading skills." In G.D. Phye (Ed.), Handbook of academic learning, 1997, pp. 199–234, San Diego, CA: Academic Press.

Royer, J.M. & Carlo, M.S., "Assessing language comprehension skills in cross–cultural settings." In J. Altarriba (Ed.), Cognition and culture: A cross–cultural approach to psychology, 1993, pp. 157–175.

* cited by examiner

Primary Examiner—Xuan M. Thai
Assistant Examiner—Kathleen M. Christman
(74) Attorney, Agent, or Firm—Bereskin & Parr

(57) ABSTRACT

This invention relates to a method and system that allows for testing the deep understanding that a student has for a concept by using the Meaning Equivalence Instructional Methodology (MEIM). The MEIM involves a meaning probe having a plurality of items. Each item has a plurality of statements and the student must select at least two statements having the same meaning. The meaning probe is then scored and feedback is provided. The MEIM allows instructors to test one or more students in any subject area. The MEIM also allows a student to perform self-tests. Furthermore, the scoring feedback provided by the MEIM allows for a remediation program to indicate to the student which areas of knowledge require strengthening. Accordingly, MEIM may also be used as a learning tool. MEIM may be applicable to elementary, secondary, post-secondary, adult and workplace learning environments.

43 Claims, 8 Drawing Sheets

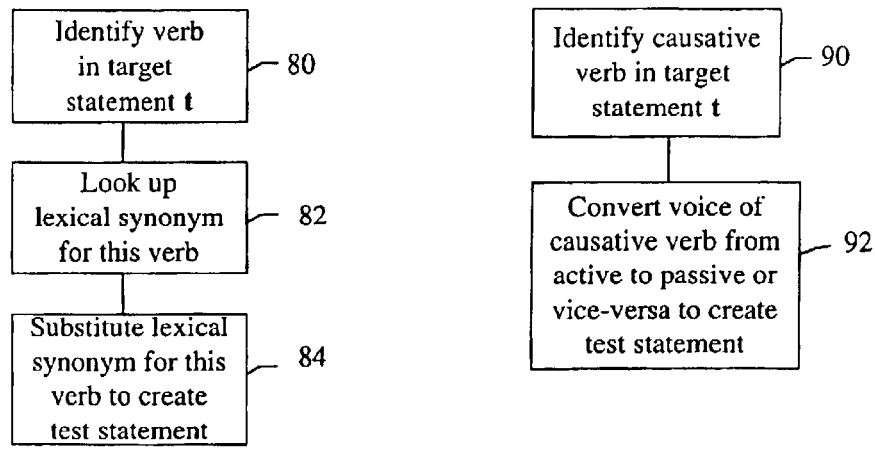
FIGURE 7
FIGURE 8
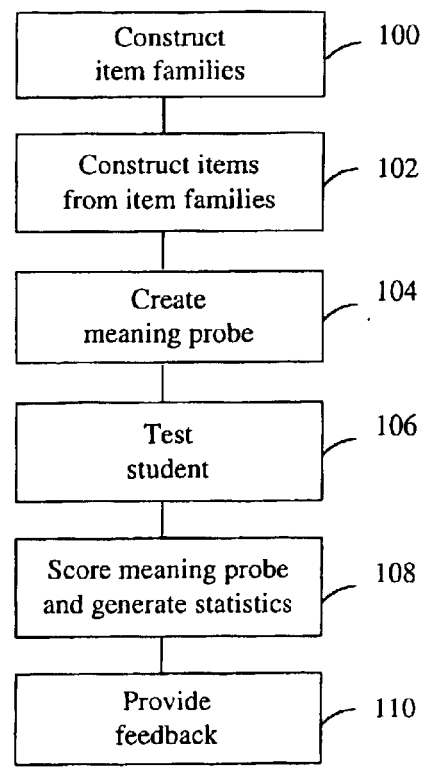
FIGURE 9

Target statement
t

| | SURFACE SIMILARITY (SS) | |
|---|---|---|
| | YES | NO |

| MEANING EQUIVALENCE (ME) | | |
|---|---|---|
| YES | Q1<br>SS = YES  *looks the same*<br>ME = YES  *means the same*<br><br>1a ___<br>1b ___<br>.<br>.<br>.<br>1n ___ | Q2<br>SS = NO  *looks different*<br>ME = YES  *means the same*<br><br>2a ___<br>2b ___<br>.<br>.<br>.<br>2n ___ |
| NO | Q3<br>SS = YES  *looks the same*<br>ME = NO  *means different*<br><br>3a ___<br>3b ___<br>.<br>.<br>.<br>3n ___ | Q4<br>SS = NO  *looks different*<br>ME = NO  *means different*<br><br>4a ___<br>4b ___<br>.<br>.<br>.<br>4n ___ |

FIGURE 10

MEANING EQUIVALENCE INSTRUCTIONAL METHODOLOGY (MEIM)

FIELD OF THE INVENTION

This invention relates to education and more particularly to a method and system that allows for testing the deep understanding of a student. The invention also relates to a system and method that enables a student to perform self-tests. The invention may be applicable to elementary, secondary, post-secondary, adult and workplace learning environments.

BACKGROUND OF THE INVENTION

Contrary to common belief, the most fundamental challenge to the emergent knowledge based economy is not the creation of new knowledge but rather is the problem of enabling individuals to access and manipulate knowledge that is new to the individual. In order for this to occur, individuals must learn the new knowledge and understand how to manipulate it. In today's environment, this should be done by all individuals, from elementary students to secondary students, to post-secondary students and adults in the workplace.

The conventional learning process can be understood in the context of an instructor and a student. The instructor teaches material that is to be learnt by the student and then assesses how well the student understands the material. This traditional teaching/evaluation process comprises three phases:

(a) Input Phase: In this phase, there is knowledge transfer from the instructor to the student. The instructor uses any perceptual means necessary to transfer the knowledge and meaning of the material being taught to the student. In this stage, the student is a listener, reader or watcher. This is the input stage from the student's perspective.

(b) Processing phase: In this phase, the student has access to the material and is trying to understand what has been taught. This is a stage in which the student is thinking to evaluate the input and construct and restructure his knowledge. During this phase, the student may also pose questions to the instructor, discuss issues and exchange opinions with his peers, and seek advice and clarification from other individuals as well as from other sources.

(c) Testing phase: In this phase, the instructor wants to determine what and how much of the material has been learnt and thoroughly understood by the student. In this phase, the student is generating information and the instructor is processing this information to determine whether, and to what extent, the student understands the material.

Unfortunately, there are shortcomings with this traditional learning process. The initial phase is problematic because the student may not understand the material being taught in the manner in which the instructor presents the material. For any one student, it may be beneficial to present the material in an alternative fashion or another context to allow the student to see the material from a different perspective and thus attain a deeper level of comprehension.

Another shortcoming is the testing process in which the student is usually asked to reproduce or recognize some part of the material that has been taught. Unfortunately, this testing methodology encourages the student to memorize the material, sometimes without understanding it, and simply reproduce the material or apply an algorithm or a well-rehearsed rule without necessarily understanding the underlying concepts. Furthermore, instructors have also been known to teach to the test such that the student will be trained on problems which will be on the test. This allows the student to perform well on the test and gives the impression that the instructor is a good teacher which may not necessarily be the case. In addition, the testing process (e.g. asking multiple choice questions, true/false questions, etc.) often involves asking the student questions about details such that the answers provided by the student to these questions often do not reveal the depth of comprehension that the student has acquired for the material that has been taught.

Both of these problems are exasperated in the post-secondary environment because there may be as many as 1000 to 2000 students enrolled simultaneously in the same course. This large number of students prevents adequate instructor/student interaction from occurring. Typically only a few students ask the instructor questions or see a teaching assistant for help. Thus, the input phase of learning is limited.

Furthermore, the large number of students taking a given course places limitations on the testing phase. Typically, in order to test such a large number of students, the instructor uses a multiple choice test for which the student may cram, memorize material verbatim and may subsequently receive a high mark. Thus, these tests provide little value to the instructor in determining how knowledgeable the student is. Alternatively, essay questions may be used in the testing process but these are difficult to mark since, in a large enrolment course with several teaching assistants, different teaching assistants mark the answers to the essay questions and each may have an inherently unique subjective marking criteria. This prevents the uniform marking of answers to essay questions.

These problems in the assessment of deep comprehension of newly learned concepts have been widely recognized. In response, there have been attempts by instructors to develop alternative methods for probing students to determine their true level of deep understanding. These methods include: Concept Mapping, Prediction-Observation-Explanation, Interviews about Instances and Events, Interviews about Concepts, Drawings, Fortune Lines, Relational Diagrams, Word Association and Question Production. However, none of these educational methods have been shown to assess deep understanding with high construct validity and reliability. A high reliability test refers to a test which is administered several times and produces similar results each time. A test with construct validity refers to a test which correctly measures or tests for the desired construct.

One attempt at assessing deep understanding was made by Royer and his associates (Royer, J. M. (1990), "The Sentence Verification Technique: A new direction in the assessment of reading comprehension." in S. M. Legg and J. Algina (Eds.), Cognitive assessment of language and math outcomes, pp. 144–191; Royer, J. M. (1997), "Cognitive perspective on the assessment, diagnosis, and remediation of reading skills." in G. D. Phye (Ed.), Handbook of academic learning, pp. 199–234; Royer, J. M., & Carlo, M. S. (1993), "Assessing language comprehension skills in cross-cultural settings." in J. Altarriba (Ed.), Cognition and culture: A cross-cultural approach to psychology, pp. 157–175). Royer teaches a new method, the Sentence Verification Test (SVT), for assessing the listening and reading comprehension of students for paragraphs and sentences. In the reading version of the SVT, after reading a paragraph consisting of 12 sentences, the student is presented with several test sentences and is asked to identify each of the test sentences as either being an old sentence (i.e. the test sentence is similar to one of the sentences in the paragraph that was just read) or a new sentence. The old sentences may either be the original sentences in the paragraph or paraphrases of the sentences that appeared in the paragraph. The paraphrased sentences are created by changing as many words as possible in the original sentence without altering the meaning of the original sentence. The new sentences have a different meaning compared to the sentences in the paragraph. The different meaning may be due to changing one or two words in the original sentence in the paragraph. The new sentences may also be distracters which are sentences that are syntactically and thematically similar to the original sentences in the paragraph but do not share their meaning. Royer also teaches another version of the SVT called the Meaning Identification Technique (MIT) in which only paraphrased sentences or sentences with different meanings, compared to the sentences in the original paragraph, are presented to the student following the reading of the paragraph. SVT and MIT have been shown to be good measures of listening and reading comprehension, text readability, reading skill, and working memory. However, by providing the student with a target statement, i.e. the original paragraph, these testing methods are prone to being a memory-for-text and not a test for deep comprehension of content.

While there has been much effort and emphasis on developing new learning/testing methods for students in the elementary, secondary and post-secondary environments, the adult education and corporate training environments have currently not been widely recognized as a scholarly discipline worthy of a similar effort. However, the need for adult learning is gaining recognition as an important social goal and is attaining high priority. One of the driving factors for adult learning is the fast changing workplace which requires innovative education and training programs to aid corporations in maintaining competitiveness by using efficient and cost-effective training methods to educate employees. These methods are also beneficial in helping employees ease transition-induced stress by facilitating the learning process and by optimizing learning outcomes. However, in developing adult training methods, one must be careful to avoid the shortcomings of the traditional learning process that were just discussed.

Accordingly, there still remains a need for an improved testing methodology that can assess the deep understanding of a student after the student has been taught material with new conceptual content in a given subject area. It would also be beneficial if this test methodology could be used as a tool that enhances learning. In addition, it would be beneficial if the test methodology could be extended to adult learning and to corporate environments. It would be further beneficial if the test methodology could use any learning delivery mode, i.e. classroom-based instruction, as well as Internet and computer-based instruction.

SUMMARY OF THE INVENTION

This invention provides a method for testing a student in a given subject area comprising the steps of:
 a) providing a meaning probe which comprises a plurality of items that each comprise a plurality of statements;
 b) testing the student with the meaning probe in the subject area by having the student select at least two statements having the same meaning;
 c) scoring the meaning probe; and,
 d) providing feedback.

Each item comprises a target statement and a plurality of test statements. The target statement is unmarked and encodes a concept about the subject area being tested.

Each test statement can have one of a similar appearance and a different appearance compared to the target statement.

Furthermore, each test statement can have one of an equivalent meaning and a different meaning compared to the target statement.

The method can further comprise identifying correct and incorrect statements in accordance with step (b) and scoring the meaning probe by:
 e) computing a global score which comprises the total number of items in which all of the correct statements were identified by the student;
 f) identifying the correct and incorrect statements for each item;
 g) computing a first partial score and a second partial score for each item wherein computing the first partial score comprises totaling the number of correct statements that were selected by the student divided by the total number of correct statements for the item and computing the second partial score comprises totaling the number of incorrect statements that were selected by the student divided by the total number of incorrect statements for the item.

Correct statements are defined as statements that share equivalence-of-meaning. Incorrect statements are defined as statements that do not share equivalence-of-meaning.

In another aspect, the invention provides for a system for testing a student in a given subject area, the system comprising a computer having a Meaning Equivalence Instructional Methodology (MEIM) software program comprising:
 a) a meaning probe module for testing the student with a meaning probe in the subject area;
 b) a scoring module for scoring the meaning probe;
 c) a statistics module for computing statistics; and
 d) a feedback module wherein, the meaning, scoring, statistics and feedback modules are interconnected, and wherein, the meaning probe comprises a list of items and each item comprises a plurality of statements, wherein, for each item, the student must select at least two statements having the same meaning.

The MEIM software program can further comprise an item generator module for generating the items, an MEIM main module for controlling the operation of the software program, a master database and a database authoring module, wherein the MEIM main module is connected to the item generator module, the master database and the database authoring module and wherein the master database comprises a plurality of individual databases. Each individual database comprises item families that are adapted for use by the item generator module to generate items.

The database authoring module is preferably adapted to create new individual databases and augment already existing individual databases by adding new item families to the already existing individual databases.

Generally, the meaning probe will have items with unidentified target statements. However, in some applications, an item may have an identified target statement although the concepts of surface similarity and meaning equivalence will still be used to generate the test statements for the item. For example, in some applications the student might be asked to produce statements that share equivalence-of-meaning with a marked target statement, but that do not share surface similarity with it. Alternatively, the student might be asked to produce statements that share surface similarity with a marked target statement but that do not share equivalence-of-meaning with it.

BRIEF DESCRIPTION OF THE DRAWINGS

For a better understanding of the present invention and to show more clearly how it may be carried into effect, reference will now be made, by way of example, to the accompanying drawings which shows preferred embodiments of the present invention and in which:

FIG. 7 is a flowchart illustrating the SYNONYM algorithm;

FIG. 8 is a flowchart illustrating the ACTIVE/PASSIVE algorithm;

FIG. 9 is a flowchart of the Meaning Probe test process;

FIG. 10 is a Surface Similarity—Meaning Equivalence matrix; and,

DETAILED DESCRIPTION OF THE INVENTION

The present invention comprises a method and a system for testing the deep comprehension of a student after the student has been taught new conceptual content in a particular subject area. The test methodology can be applied to any subject area such as a language (i.e. English, French, etc.), math, physics, biology, engineering, architecture, visual arts, history, psychology, sociology, business, etc. The test methodology provides feedback on the specific deficiencies, misunderstandings and misconceptions that a student may have for the concepts that were taught. The test methodology thus provides detailed feedback for deficiencies that the student may have in learning and allows the student to remedy these deficiencies and to enhance his learning outcomes. Accordingly, the test methodology may be used as a learning tool in addition to a test tool. In this description an overview of the system which implements this test methodology will first be presented along with a general, broad description of the test methodology. A more detailed discussion of the test methodology will then follow.

Figure 1:
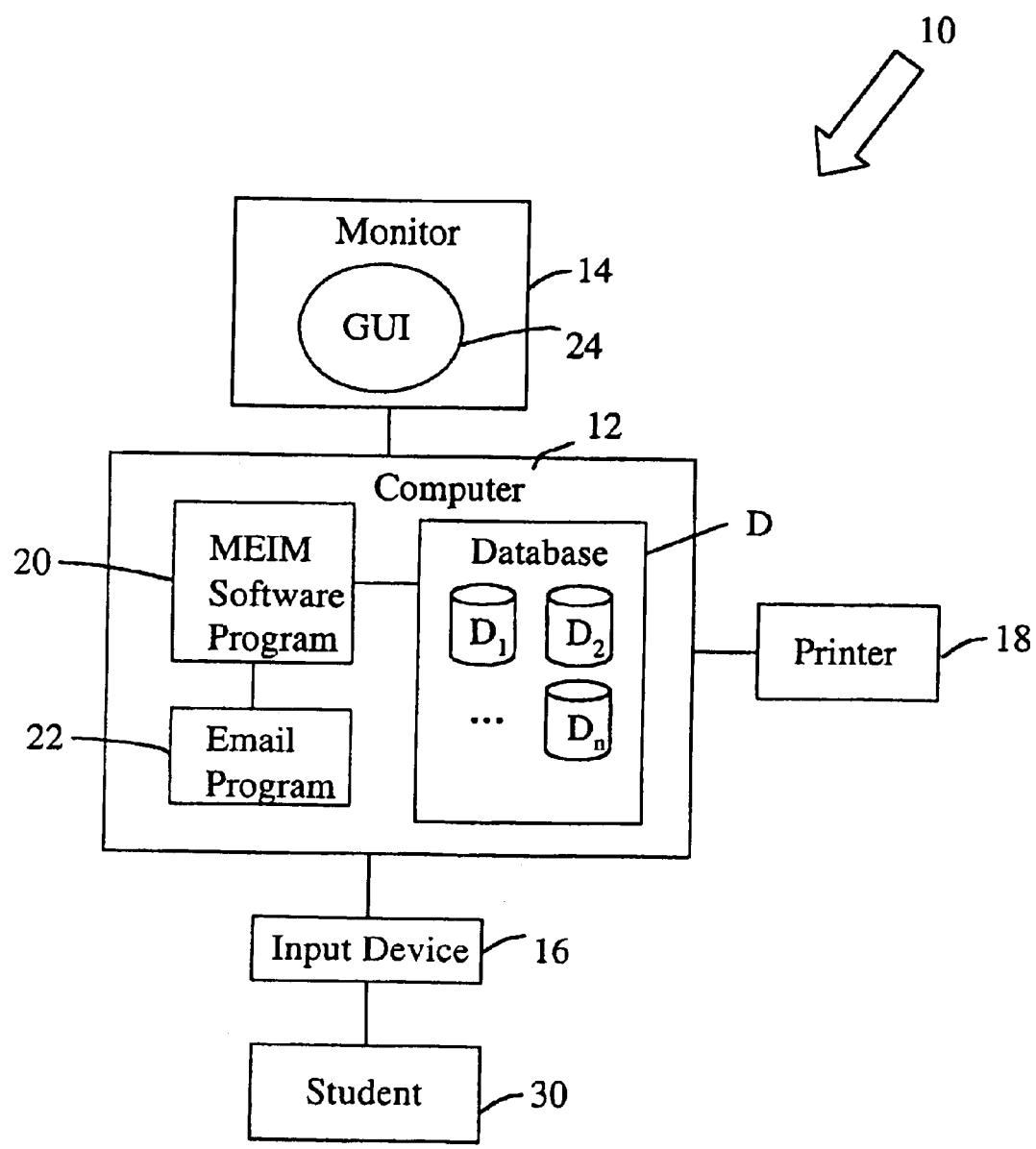
FIG. 1 is a schematic of a computer system that effects the testing/training methodology of the present invention.

Referring to FIG. 1, a Meaning Equivalence Instructional Methodology (MEIM) test system 10 is shown comprising a computer 12, a computer monitor 14, an input device 16 and a printer 18. The computer 12 comprises an MEIM software program 20, an email program 22, and a master database D comprising a plurality of individual databases $D_1, D_2, \ldots, D_n$ as well as the usual computer software and hardware components required for computer operation (not shown). The computer 12 runs the MEIM software program 20 to test a student 30. The MEIM software program 20 can be implemented using any suitable software programming language.

In use, the student 30 interacts with the MEIM software program 20 via the input device 16 and a graphical user interface (GUI) 24 which is displayed on the computer monitor 14. The input device 16 may be one or more of a keyboard, a mouse, a touch sensitive screen and a voice-activated interface. After the student 30 completes the meaning probe (i.e. test), the student may view his/her results on the computer monitor 14. The student may also print out his/her results on the printer 18 and/or email his/her results to a personal email account using the email software program 22.

Figure 2:
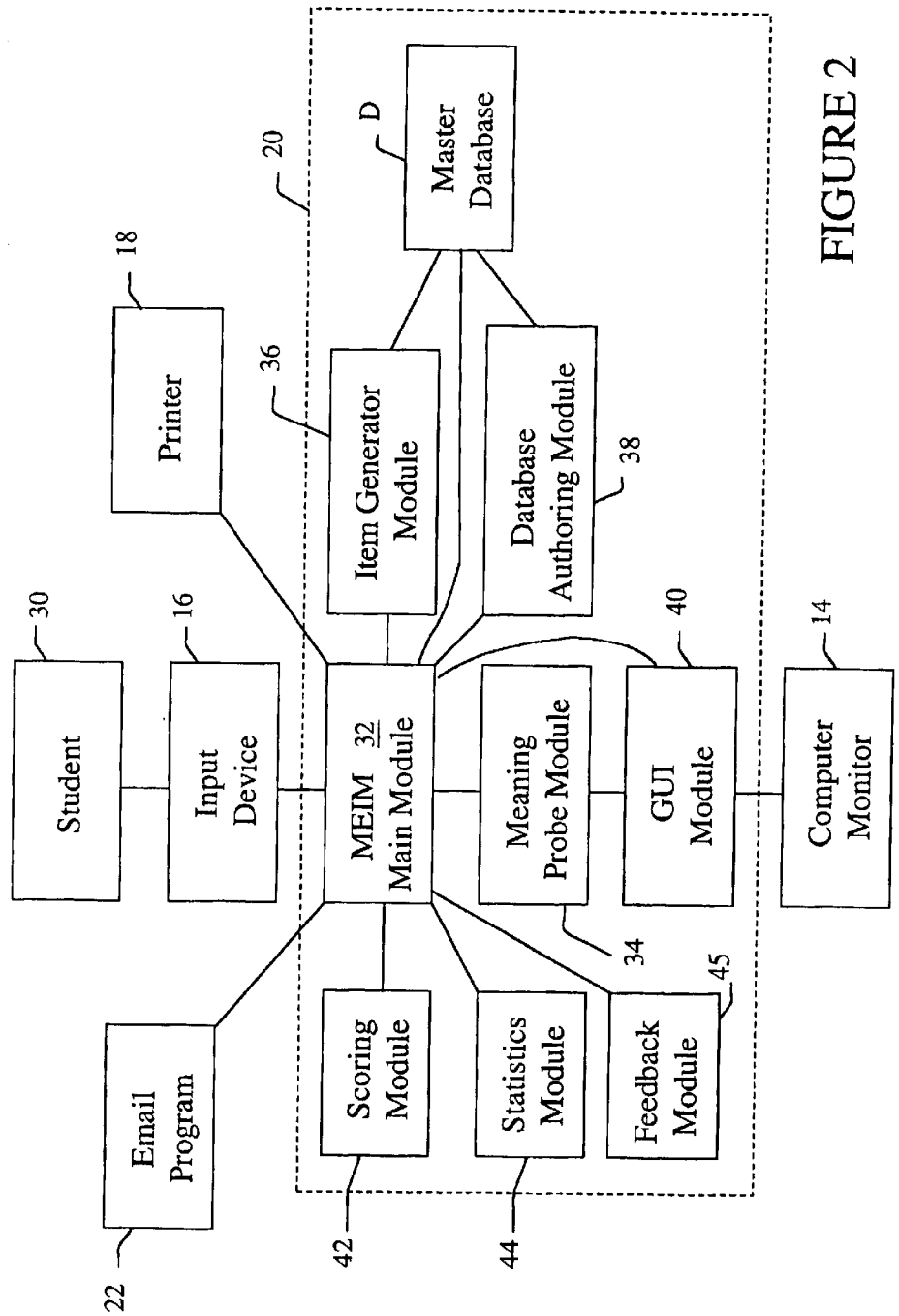
FIG. 2 is a schematic of the Meaning Equivalence Instructional Methodology software program and certain parts of the computer system.

Referring to FIG. 2, the MEIM software program 20 (shown in the dotted line) comprises an MEIM main module 32, a meaning probe module 34, an item generator module 36, a database authoring module 38, a GUI module 40, a scoring module 42, a statistics module 44 and a feedback module 45 interconnected as shown. The MEIM main module 32 controls the functionality of the MEIM software program 20. The MEIM main module 32, via the GUI 24, allows the student 30 to choose from a variety of options such as selecting a particular meaning probe to take, viewing test results, constructing self-test meaning probes, etc. A meaning probe refers to a test in which the deep understanding of the student 30 in a given subject/content area is tested. The MEIM main module 32 generates a meaning probe by from an individual database $D_i$ from the master database D. Accordingly, each database $D_i$ contains information on a particular subject area.

The items are questions that the student 30 must answer. Each item comprises a target statement and several other test statements. Each of the test statements may be similar or dissimilar in meaning to the target statement. In addition, each of the test statements may be similar or dissimilar in appearance to the target statement. Thus, there are four possibilities for each test statement: 1) the test statement has the same meaning as the target statement and looks similar to the target statement, 2) the test statement has a different meaning than the target statement and looks similar to the target statement, 3) the test statement has the same meaning as the target statement but does not look similar to the target statement and 4) the test statement has a different meaning and does not look similar compared to the target statement. The item must contain at least one test statement which has a similar meaning to the target statement. During the meaning probe, the student 30 is not told what the target statement is for each item. The student 30 is presented with a question having several statements. The student 30 must therefore identify the target statement and the test statements that are similar in meaning to the target statement for each item in the meaning probe. In this fashion, the MEIM test methodology tests the student 30 for the deep understanding of a concept or concepts in any given subject area. Actually, from the point of view of the student 30, there is no difference between the target statement and statements that have the same meaning and appear similar to the target statement. The important point is that the student 30 must select statements that have the same meaning.

The MEIM main module 32 then conducts the meaning probe by invoking the meaning probe module 34. The meaning probe is displayed via the GUI 24, which is generated by the GUI module 40, on the computer monitor 14. The student 30 provides answers to each item on the meaning probe via the input device 16. Once the student 30 completes the meaning probe, the MEIM main module 32 invokes the scoring module 42 to mark the answers provided by the student 30. The MEIM main module 32 then invokes the statistics module 44 to generate test statistics based on the scored meaning probe.

The feedback module 45 is used to provide the test statistics in a detailed report. Accordingly, the feedback module 45 provides feedback to one or both of the student 30 and the instructor. The student 30 may print out the test results using the printer 18 or may email the test results to his/her personal email account for later viewing using the email program 22. The test statistics provide the student 30, or alternatively an instructor who may be testing the student 30, with a fairly detailed evaluation of the deep understanding that the student 30 has for the subject area that has just been tested. Alternatively, for some applications, the results may be analyzed solely by someone setting the meaning probe. The test statistics can be used to map out a learning profile for the student 30 which can be used to adapt the learning process of the student 30 so that the student 30 will be able to better understand the subject area that is currently being studied/tested. The test statistics allows the student 30 to identify any knowledge deficiencies that he or she may have as well as to identify any fundamental learning difficulties such as not being able to discriminate statements based on their meaning or appearance.

The MEIM test system 10 may be used by an instructor to test a single student or a plurality of students by constructing a particular meaning probe. Accordingly, the MEIM test system 10 may provide a generic template for the design of meaning probes. This generic template would involve the use of the item generator module 36 and the meaning probe module 34 to guide the instructor through a series of steps to create a meaning probe for test purposes or for tutorial purposes to aid students in studying the subject area. There may be a generic template for each subject area that is stored in the master database D. Alternatively, as previously described, the MEIM test system 10 may be used by the student 30 for self test purposes. Accordingly, the generic template could be used by the student 30 to generate meaning probes that may be used for self-testing.

The MEIM meaning probe may also be generated by hand (as in the case of chalk and a blackboard, or in using pencil and paper). The MEIM meaning probe may also be conducted on any computing device such as a personal computer, a laptop or a hand-held device. The MEIM meaning probe may also be created on a computer and then recorded on a diskette or on CD, or printed on paper that is then distributed to students during a test. The MEIM meaning probe may also be performed via teleconferencing (i.e. satellite based transmission for remote learning) or via the Internet.

An instructor or another individual may use the database authoring module 38 to create an individual database $D_i$ which is stored in the master database D. The database authoring module 38 is an interface that prompts the individual to go through a series of steps to create item families which are stored in the individual database $D_i$. An item family consists of a target statement and a plurality of test statements that are related to the target statement. Accordingly, items may be generated from an item family stored in an individual database $D_i$ contained within the master database D. The individual may also use the database authoring module 38 to augment already existing databases $D_i$ within the master database D.

These MEIM databases may also be created as an aftermarket add-on for textbooks that are used in courses. For instance, a generic MEIM database may be constructed for a given subject area. This generic MEIM database may consist of a plurality of item-families which each have a target statement that captures a concept or a certain aspect of a concept in the subject area. For instance, there may be 100 different concepts in a given subject area which may be encoded in as many as 500 item-families (i.e. 5 item-families per concept). Alternatively, a larger or smaller number of items can be used to encode each concept. This database may then be adapted to focus on the concepts, on a chapter-by-chapter basis, that a specific textbook may teach in that subject area. When there is a new edition of the textbook, the database may be adapted to conform to the new edition. These databases may then be used by students to perform self-tests so that the students can determine which concepts they understand and which concepts they must improve on. The databases may also be incorporated into a course curriculum to reinforce the material that is taught. Therefore, a plurality of databases that are content specific for different subject areas or disciplines may be constructed.

Figure 3:
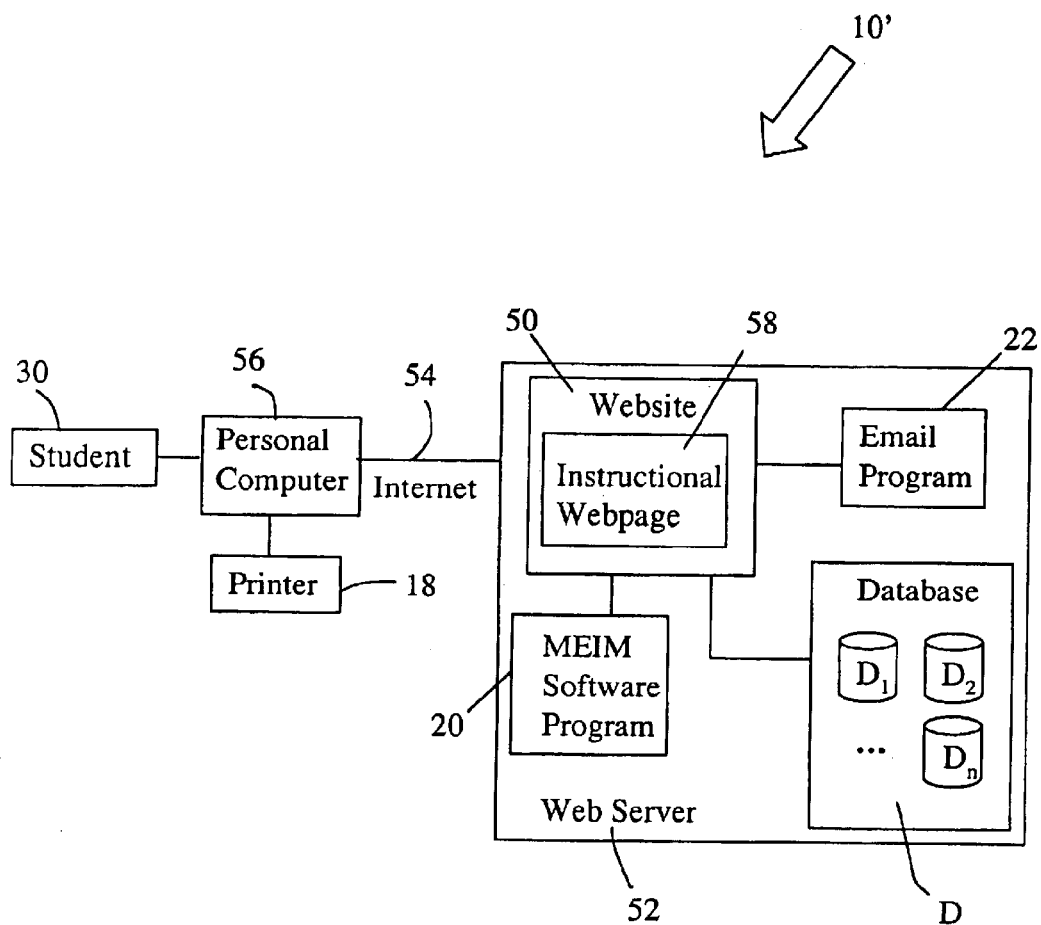
FIG. 3 is a schematic of an alternate embodiment of the present invention that involves effecting the testing/training methodology over the internet.

Referring to FIG. 3, shown therein is an alternative embodiment of MEIM test system 10' in which the MEIM software program 20 may be effected on a web site 50 which is maintained on a web server 52. The web server 52 also comprises the email program 22 and the master database D which includes the plurality of individual databases $D_1$, $D_2, \ldots, D_n$. The web site 50 is then accessed via the internet 54 by the student 30 using a personal computer 56. Alternatively, a hand-held device may be used. As previously described, the MEIM software program 20 may permit meaning probes to be conducted on a variety of subjects through the use of subject specific databases $D_1, D_2, \ldots, D_n$. The web site 50 may also have an instructional web page 58 which can be used to teach an individual on the theory of MEIM to help the individual create his/her own meaning probes. After the student 30 completes the meaning probe, the student 30 may print out test results using the printer 18. Alternatively, the web site 50 may email the student 30 the test results using the email program 22. Once again, the results may be used solely for evaluation by someone setting the meaning probe and in this case the results could be emailed to such a person or made accessible to them at a designated web site.

The MEIM test methodology may be applied to a wide range of individuals. Students from the elementary, secondary and post-secondary school systems may take MEIM meaning probes to determine how deeply each student understands a given subject area. MEIM meaning probes can be taken by normally achieving students as well as by students who have been diagnosed with learning disabilities since MEIM meaning probes do not test for word decoding or reading comprehension skills, but rather probe for deep comprehension of meaning. This is beneficial since special tests do not have to be made for students who have learning disabilities. Therefore, students with learning disabilities can write the same test under the same test conditions as students who do not have learning disabilities and can also be evaluated using the same set of criteria. This is not available with current tests. Accordingly, MEIM meaning probes may be developed and stored in databases that instructors may access to generate tests for the students. Alternatively, the student may access these databases to perform self-tests.

The MEIM test methodology may also be applied to certification testing which is required by professional organizations for psychologists, lawyers, accountants, architects, medical doctors, engineers, registered nurses, etc. In addition, the MEIM test methodology may be applied to formal assessments such as Advanced Placement, GRE, SATs, LSATs, MCATs, GMATs, etc.

The MEIM test methodology may further be applied to adults in the workplace. In particular, for adult education/training, the MEIM test methodology may involve the design and implementation of both generic and content-specific meaning probes for training courses. In particular, for the corporate environment, databases may be constructed which contain a plurality of items to effect meaning probes. This is well suited for knowledge areas that are formalized and well codified such as accounting, as well as for emergent knowledge areas that are unformalized, which is often the case in the corporate training area. All that is required is for a company to indicate which material should be taught in a training course. This material can then be subject to concept mapping in order to identify the underlying concepts that form the content-specific knowledge base for the material. These concepts can then be used to create items that may be used in corporate training. The MEIM test methodology may also be classroom based, involve small groups of students or may be implemented on the internet on distance learning platforms.

An MEIM-based learning platform or system could also comprise learner-centered tutorials having self-tests of new concepts and procedures, as well as new skills which comprise:

a) a set of templates for the creation of tutorials focused on new concepts. The tutorials would include meaning probes for self-tests. These templates may be used to scaffold learning in any content area with special emphasis being placed on using language as well as other sign systems (e.g. graphic, pictorial, math, tables, etc) to encode equivalent meaning through multiple representations;

b) a set of templates for the construction of self-tests by the instructor, and that allow the student to assess the degree of mastery of newly acquired knowledge and skills; and, c) embedded scoring algorithms and report-generating procedures that provide the student and the instructor with accurate and detailed feedback regarding optimal as well as sub-optimal aspects of the mastery of new concepts.

Meaning Equivalence Instructional Methodology (MEIM) Theory

The basic concept of Meaning Equivalence Instructional Methodology (MEIM) is the commonality of meaning across several different representations of a statement, fact or concept. In particular, meaning equivalence involves using shared sign systems such as natural language, numbers, math symbols, graphic images, pictures and the like to express equivalent meaning through multiple representations. These different representations with equivalent meaning may encode different points of view, use different vocabulary or use different syntactic and grammatical structures. The reason behind using different representations is that the inventor has found that learning can be enhanced if the student acquires the ability to encode, decode and recognize equivalence of meaning in multiple representations of concepts.

The MEIM test methodology also involves providing the student with a careful analysis of erroneous decision making within the learning context. The student can use this analysis to learn from mistakes and understand which aspects of knowledge need to be strengthened. The analysis of erroneous decision making also allows the student to identify if they have trouble when information is presented in a certain format. The other aspect of MEIM test methodology is that the student being assessed isn't aware of the target of the assessment because the target statement isn't marked in the item. In prior testing methods, the target is clearly defined; i.e. the target is basically the question being asked in a multiple choice test. Since the MEIM test methodology does not identify the target statement, the deep understanding that a student has for a given concept may be tested. Furthermore, since the target statement is not identified, there is no way to cram for this test; the student must thoroughly understand the concepts in the subject area that is being tested in order to succeed on MEIM meaning probes.

MEIM involves the decomposition of statements into two orthogonal components based on the concepts of 'surface similarity' and 'meaning equivalence', compared to a target statement. The statements may be generated from a short paragraph that describes a concept. Accordingly, each generated statement will involve some aspect or feature of the concept. These statements may come from textbooks or they may come from a panel of individuals who are experts in the subject area, and who construct a concept mapping of the subject area.

The concept of surface similarity involves comparing statements to see if they are similar in appearance; i.e. the student 30 must determine, for example, with language statements, whether the statements substantially have the same words in substantially the same order. For instance the particular choice of words and the order of these words in the statements dictate the surface similarity of the statements. If the statements have the same or similar words in the same or similar sequence as the target statement, then the statements should have a high degree of surface similarity. This concept may be extended to the mathematical sciences; i.e. the student 30 must determine whether the mathematical statements have the same/similar numbers or variables or same/similar equations. The MEIM test methodology may also be extended to the visual-based sciences; i.e. the student 30 must determine whether the graphic images in different statements appear similar. Accordingly, the term statement may mean a language statement, a mathematical equation or mathematical expression, picture, and the like.

Figure 4:
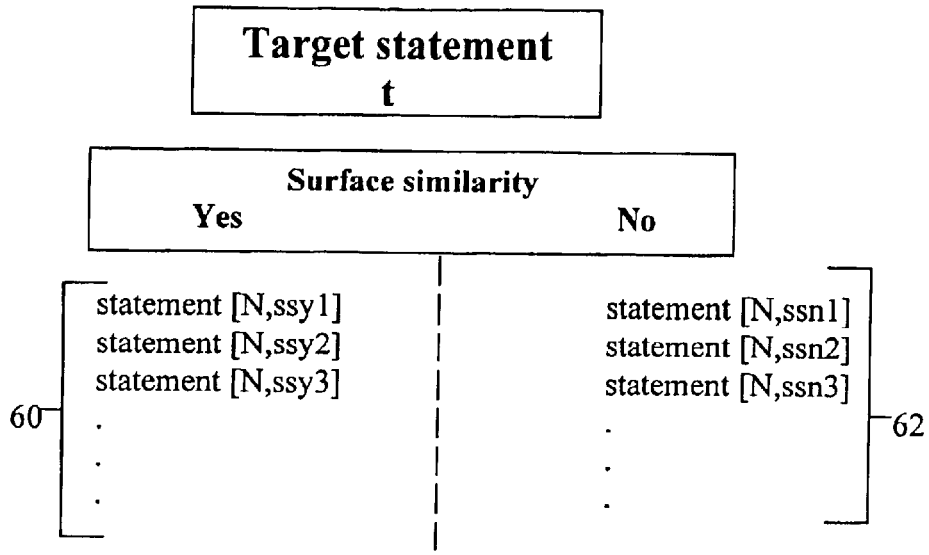
FIG. 4 is a table illustrating the sorting of statements based on surface similarity.

Referring to FIG. 4, the statements are separated into two groups 60 and 62. To separate the statements into these two groups, a target statement must be defined which contains some feature or aspect of the concept that is being taught. The first group of statements 60, on the left, includes all the statements (i.e. the test statements referred to previously) that look similar to the target statement t, namely, in the case of linguistic representation, statements that use the same or similar words in the same or similar order (this can also be extended to other sign systems, for example similar numbers or similar pictorial elements). The second group of statements 62, on the right, includes the remaining statements, i.e., those statements that fulfill the default criterion of not bearing surface similarity to the target statement t. In FIG. 4, N indicates the ordinal index which uniquely identifies a given statement. The label "ssy" indicates that the statement has surface similarity with respect to the target statement and the label "ssn" indicates that the statement does not have surface similarity with respect to the target statement t.

The concept of meaning equivalence involves comparing two statements, i.e. the target statement t with another statement (i.e. the test statement referred to previously) to determine if the statements have equivalent meaning. In this case, the statements may have equivalent meaning with or without having the same appearance (i.e. surface similarity). Once again, using the example of language-based statements, the particular choice of words and the order of these words in the statements dictate the meaning equivalence of the statements.

Figure 5:
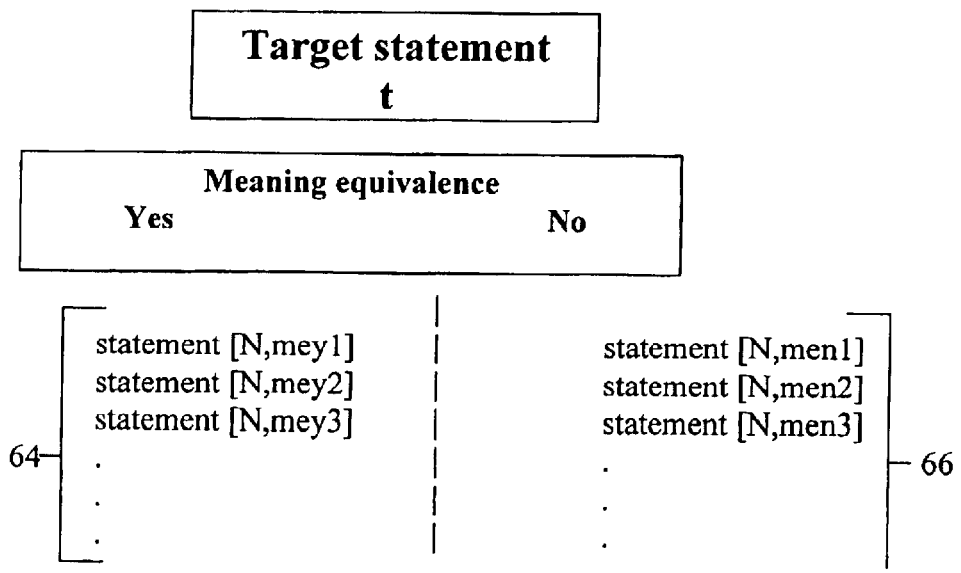
FIG. 5 is a table illustrating the sorting of statements based on meaning equivalence.

Referring to FIG. 5, the statements are also separated into two groups 64 and 66. Once again, to separate the statements into these two groups, a target statement identical to the target statement in FIG. 4 is used. The first group of statements 64, on the left, includes all the statements that have the same meaning as the target statement t. The second group of statements 66, on the right, includes the remaining statements, i.e., those statements that fulfill the default criterion of not having meaning equivalence with respect to the target statement t. In FIG. 5, N indicates the ordinal index that uniquely identifies a given statement. The label "mey" indicates that the statement has meaning equivalence with respect to the target statement and the label "men" indicates that the statement does not have meaning equivalence with respect to the target statement.

The next step in MEIM involves the double sorting of the statements according to the criteria of surface similarity and meaning equivalence with respect to the target statement t. This allows for the construction of a new type of assessment procedure (i.e. the meaning probe) that probes the student's mind for deep comprehension of the material that is being taught.

Figure 6:
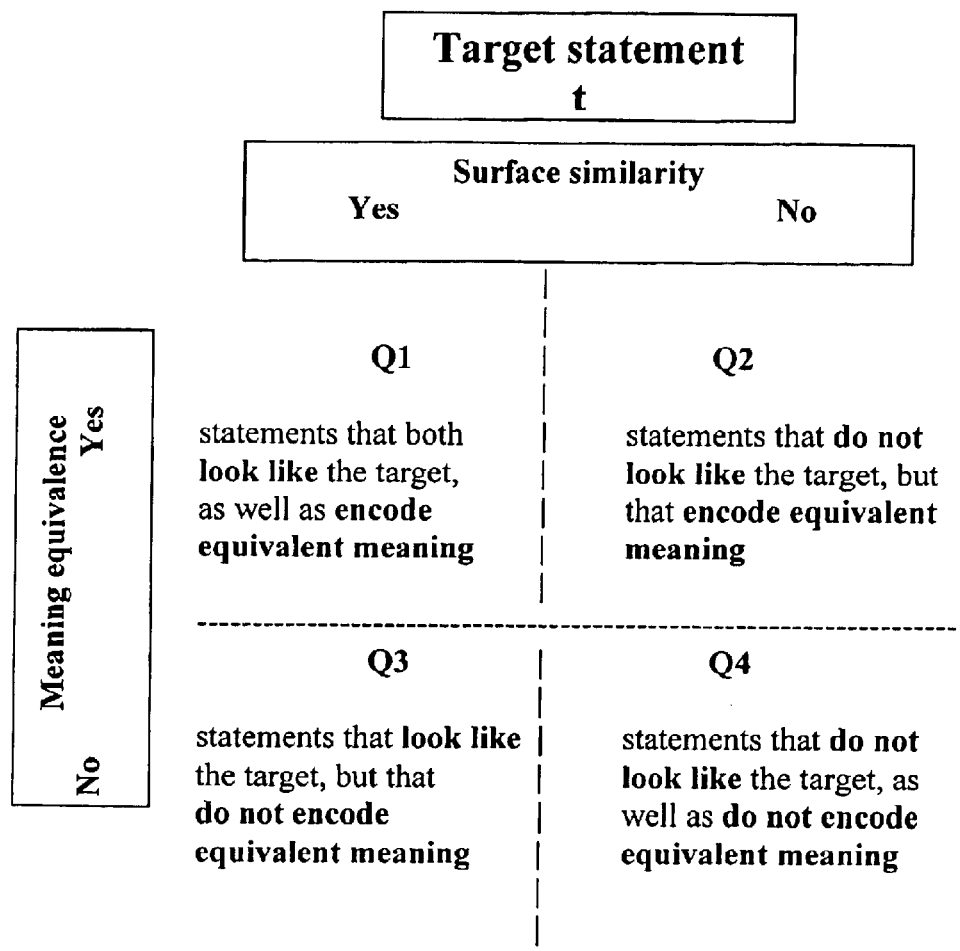
FIG. 6 is a table illustrating the double sorting of statements based on surface similarity and meaning equivalence.

Referring to FIG. 6, the double-sort results in a Surface Similarity-Meaning Equivalence (SSME) matrix that has four quadrants, i.e. Q1, Q2, Q3, and Q4. These quadrants, based on the surface similarity and meaning equivalence between the test statements and the target statement t, are mutually exclusive. The test statements that are placed in the quadrant Q1 have both surface similarity and meaning equivalence compared to the target statement t. The test statements that are placed in the quadrant Q2 do not have surface similarity but do have meaning equivalence compared to the target statement t. The test statements in the quadrant Q3 have surface similarity but do not have meaning equivalence compared to the target statement. The test statements in the quadrant Q4 do not have surface similarity and meaning equivalence with respect to the target statement.

The major diagonal of the SSME matrix, i.e. the quadrants Q1 and Q4, comprise the two groups of test statements that best fit the intuitive feeling about the relationships between surface similarity and meaning equivalence (i.e. one expects statements that mean the same to have comparable surface similarity, and correspondingly statements that do not mean the same to not have surface similarity). The statements from these quadrants are thus the easiest to understand/identify. In contrast, the minor diagonal of this matrix, i.e. the quadrants Q2 and Q3, comprise the two groups of test statements whose true nature is counter-intuitive. The quadrant Q2 includes test statements that do not bear surface similarity to the target statement but that, nevertheless, convey equivalent meaning, whereas, the quadrant Q3 includes test statements that look like the target statement t, but encode a different meaning. In both cases, the impression created by the surface structure of the test statements in the quadrants Q2 and Q 3 is counterintuitive and misleading. Accordingly, the correct interpretation of these test statements requires deep comprehension of the meaning encoded in these test statements and the target statement t.

An example of a target statement and test statements that may be in Q2 or Q3 is shown in Table 1. In this example, the target statement (a) and the test statements (b), (c) and (d) have an equivalent meaning to the target statement although they appear different, on the surface, from the target statement. Contrastingly, the test statements (e), (f and (g) may appear, on the surface, to be similar to the target statement, however, these test statements do not have an equivalent meaning to the target statement.

TABLE 1

Example of a target statement and test statements.

| Statement Type | Statement |
| --- | --- |
| Target | (a) Black-faced type of sheep prefer to stand beside one another when feeling threatened. |
| Q2 | (b) Sensing danger, black-faced sheep congregate. |
| | (c) Standing close to each other, black-faced sheep ward off danger. |
| | (d) For protection against threat, black-faced sheep tend to get in close proximity. |
| Q3 | (e) Black-faced type of sheep prefer to stand beside one another when feeling threatened. |
| | (f) Black-faced type of sheep prefer to stand on one another when feeling threatened. |
| | (g) Black-faced type of sheep prefer to stand under one another when feeling threatened. |

The surface similarity of the test statements in Table 1 to the target statement may also be apparent from counting the total number of words in each of these test statements as well as the total number of words in these test statements that are identical to the words used in the target statement. This analysis is shown in Table 2. Judging by these word counts, there is little surface similarity between the target statement and each of the 3 test statements in Q2 (i.e. statements (b), (c) and (d)), both in the total number of words as well as in the number of identical words. In fact, there are only three words that are common to all 4 statements, i.e. 'black-faced sheep'. However, the test statements (b), (c) and (d) share equivalence-of-meaning with the target statement t. On the other hand, while the number and order of words in all three test statements in Q3 (i.e. statements (e), (f and (g)) are almost identical to those in the target statement t, each one of these test statements convey a different meaning which is not equivalent to the meaning of the target statement t.

TABLE 2

Surface similarity for Table 1.

| Statement | Total Number of Words | Number of Identical Words compared to the target |
| --- | --- | --- |
| (a) | 14 | 14 |
| (b) | 6 | 3 |
| (c) | 11 | 4 |
| (d) | 13 | 4 |
| (e) | 14 | 13 |
| (f) | 14 | 13 |
| (g) | 14 | 13 |

There are two algorithms that may be used to generate the statements that belong in the quadrant Q1 from a given target statement t. These algorithms are the SYNONYM and ACTIVE/PASSIVE algorithms. The nature of these algorithms is to introduce only slight changes to the target statement t. Therefore, the resultant test statements have equivalent meaning to the target statement t and maintain a high degree of surface similarity to the target statement t.

Referring now to FIG. 7, the steps to carry out the SYNONYM algorithm are shown. The first step 80 is to identify the verb in the target statement. The next step 82 is to look up a lexical synonym for this verb and the final step 84 is to substitute the lexical synonym for the verb to create a test statement from the target statement t. The resulting test statement is a new representation of the concept captured in the target statement that has equal meaning to the target statement. An example test statement produced by this algorithm is shown in Table 3. This procedure may also be applied to the original target statement t more than once. For example, there may be several synonyms to the verb appearing in the target statement t or there may be more than one verb and each verb may have several synonyms. This same procedure may also be applied to each of the nouns and adjectives appearing in the original target statement t.

TABLE 3

Example of a test statement produced by the SYNONYM algorithm.

| Statement type | Statement |
|---|---|
| Target test (Q1) | After the elections, the committee counted the votes. After the elections, the committee tallied the votes. |

Referring to FIG. 8, the steps to carry out the ACTIVE/PASSIVE algorithm are shown. The first step 90 is to identify the causative verb in the target statement t. The next step 92 is to convert the voice of the causative verb from active to passive or vice-a-versa to generate the test statement. An example of a test statement produced using this algorithm is shown in Table 4.

TABLE 4

Example of a test statement produced by the ACTIVE/PASSIVE algorithm.

| Statement type | Statement |
|---|---|
| Target test (Q1) | The dog chased the man. The man was chased by the dog. |

To create test statements that belong to the quadrant Q2, a heuristic method may be used. This heuristic method may comprise encoding different points of view, using different vocabulary or different syntactic and grammatical structures. The only constraint on these representations is that they preserve the content of the target statement t which is defined by its semantic interpretation. An example of generating a test statement for the, quadrant Q2 based on a target statement t is shown in Table 5.

TABLE 5

Example of generating a test statement belonging to the quadrant Q2 from a target statement using a heuristic method.

| Statement type | Statement |
|---|---|
| Target | Black-faced type of sheep prefers to stand beside one another when feeling threatened. |
| test (Q2) | Sensing danger, black-faced sheep congregate. |

Testing based on the MEIM approach involves creating a meaning probe to assess deep comprehension in a given subject area using any shared sign system used by a community of language users to convey meaning. Deep comprehension is defined as the ability to demonstrate mastery of knowledge in a given subject area through flexible recognition and/or production of multiple representations that have meaning equivalence with the concept being tested. As previously mentioned, meaning probes may be designed to test deep comprehension of the English language (i.e. prepositions, etc.), arithmetic (i.e. whole numbers, fractions, graphs, etc.), the visual-based arts (pictures, architecture, etc.) and other areas.

To create a meaning probe for deep comprehension, the probe should not be a memory test for text or facts. Also the meaning probe should not test merely procedural or algorithmic knowledge. Therefore, students should not score high on a meaning probe simply because they are able to flawlessly execute well-rehearsed procedures or algorithms. The meaning probe should provide the student with multiple opportunities to recognize and/or to produce multiple representations having a meaning equivalence with a particular concept being tested. Ideally, the meaning probe should avoid formats where a standard of meaning is presented in a target statement or in a question. The student should be challenged to demonstrate deep comprehension/understanding by recognizing a number of different alternative representations that embed commonality-of-meaning with a given concept encoded in an unmarked target statement t. Alternatively, the student may be challenged to produce alternative representations that share equivalence-of-meaning, but not surface similarity, with a target statement t. In another alternative, the student may be challenged to produce alternative representations that share surface similarity, but not equivalence of meaning, with a target statement t.

Referring to FIG. 9, the steps involved in creating a meaning probe and testing a student are shown. Once, the subject area to be tested is defined, the first step 100 is to generate item families. These item families may be stored in a database $D_i$. The next step 102 is to construct a plurality of items from the item families. A meaning probe can then be created in step 104 by choosing particular items from the plurality of items that were generated in step 102. The next step 106 is to have the student complete the meaning probe. After the student has completed the meaning probe, the next step 108 is to score the answers provided by the student to the meaning probe and to generate statistics. In step 110, the statistics are used to provide a detailed feedback report. Each of these steps will now be discussed.

Constructing Item-families

An item family is a cluster of statements comprising the target statement and at least 2 other test statements but preferably several test statements in each of the 4 quadrants (Q1, Q2, Q3 and Q4) of the SSME matrix. The rationale for creating an item family is that an item family can generate several different test items that focus on the same underlying concept, but vary in level of difficulty. Furthermore, an item family may be used to emphasize different aspects of the concept embedded in the target statement. For example, different items derived from the same item family can be used in different versions of a particular meaning probe in a given content/subject area for test-retest in an intervention or remedial program.

Referring to FIG. 10, an item family is constructed based on a target statement t. The target statement t is the anchor or the content at the core of the item family. The content of the target statement t may be represented in any format: narrative, expository, abstract, etc. However, once formulated, the target statement t will determine the rest of the construction process for the other components of the current item family. Non-algorithmic, conditional concepts usually carry complex content and are therefore suitable for incorporation into target statements. These target statements may comprise features that are typically present in a concept, or features that are typically absent in a concept, or features that are irrelevant to a concept.

For the quadrant Q1, one must construct test statements that both look the same and carry a meaning that is equivalent to the target statement t. Here, as in all four quadrants, several test statements should be constructed, i.e. statements 1a, 1b, etc. Preferably, there will be at least one test statement 1a that is easily recognized as being equivalent in meaning to the target statement t and at least one test statement 1b that is more difficult to classify. For language-based test statements, the test statement 1a in the quadrant Q1 may be constructed according to the SYNONYM and ACTIVE/PASSIVE algorithms presented earlier. To generate test statements in the quadrant Q1 that are more difficult to classify, one may use less familiar synonyms to replace verbs, adjectives and nouns in the target statement t. These test statements will comprise slight changes in words and/or word order compared to the target statement t. These concepts may be extended to other types of statements (i.e. mathematical and pictorial statements for example).

For the quadrant Q2, it is preferable to construct at least one test statement 2a that is easily recognized as being equivalent in meaning to the target statement t, and at least one test statement 2b that is more difficult to classify. In addition, all test statements 2a, 2b, . . . , 2n must appear different (i.e. not have surface similarity) compared to the target statement t. In this case, the structure of the target statement t does not provide any clues as to the structure of the test statements 2a and 2b. However, there are no built-in constraints on the level of difficulty that-may be embedded in these test statements. Since the test statements in Q2 look different from the target statement t, but are equivalent in meaning, one may be as creative as possible in the construction of each of these test statements.

For the quadrant Q3, once again it is preferable to construct at least one test statement 3a that is easily recognized as being different in meaning to the target statement t, and at least one test statement 3b that is more difficult to classify. In addition, all test statements, 3a, 3b, . . . , 3n must be similar in appearance compared to the target statement t. To construct test statements for the quadrant Q3, one is not constrained by meaning-equivalence but only by surface-similarity. Accordingly, for language-based test statements, one may begin with the target statement t and introduce changes in individual words, word order, or punctuation that will change the meaning of the target statement t to produce an easy or difficult test statement. An important constraint for constructing Q3 statements is to insure that no two Q3 statements share equivalence-of-meaning.

For the quadrant Q4, it is also preferable to construct at least one test statement 4a that is easily recognized as being different in meaning to the target statement t and at least one test statement 4b that is more difficult to classify. In addition, all the test statements, 4a, 4b, . . . , 4n must be thematically related to the target statement but different in meaning and different in appearance. Unlike the test statements in the quadrant Q1, where the test statements looked the same as the target statement t (and therefore also looked like each other), in the quadrant Q4, the test statements do not look like the target statement t and thus do not have to look the same. This makes it easier to differentiate the level of difficulty between the test statements in the quadrant Q4. Since both test statements 4a and 4b look different than the target statement t, one way to construct the test statement 4b for the quadrant Q4 is to make the test statement 4b more different in meaning from the target statement t than is the test statement 4a. In other words, the semantic distance (i.e. gap in meaning) between the test statement 4b and the target statement t should be larger than the semantic distance between the test statement 4a and the target statement t. Furthermore, there should not be any meaning equivalence for test statements from the quadrant Q4 and the quadrant Q3.

In fact, for each of these quadrants, the construction of the easy and difficult test statements may incorporate the notion of the orthogonality of appearance and meaning. For instance, in the quadrant Q4, there may be test statements that are 1) easy to discriminate in terms of appearance and meaning, 2) easy to discriminate in terms of appearance but difficult to discriminate in terms of meaning, 3) difficult to discriminate in terms of appearance and easy to discriminate in terms of meaning and 4) difficult to discriminate in terms of appearance and meaning.

Figure 11:
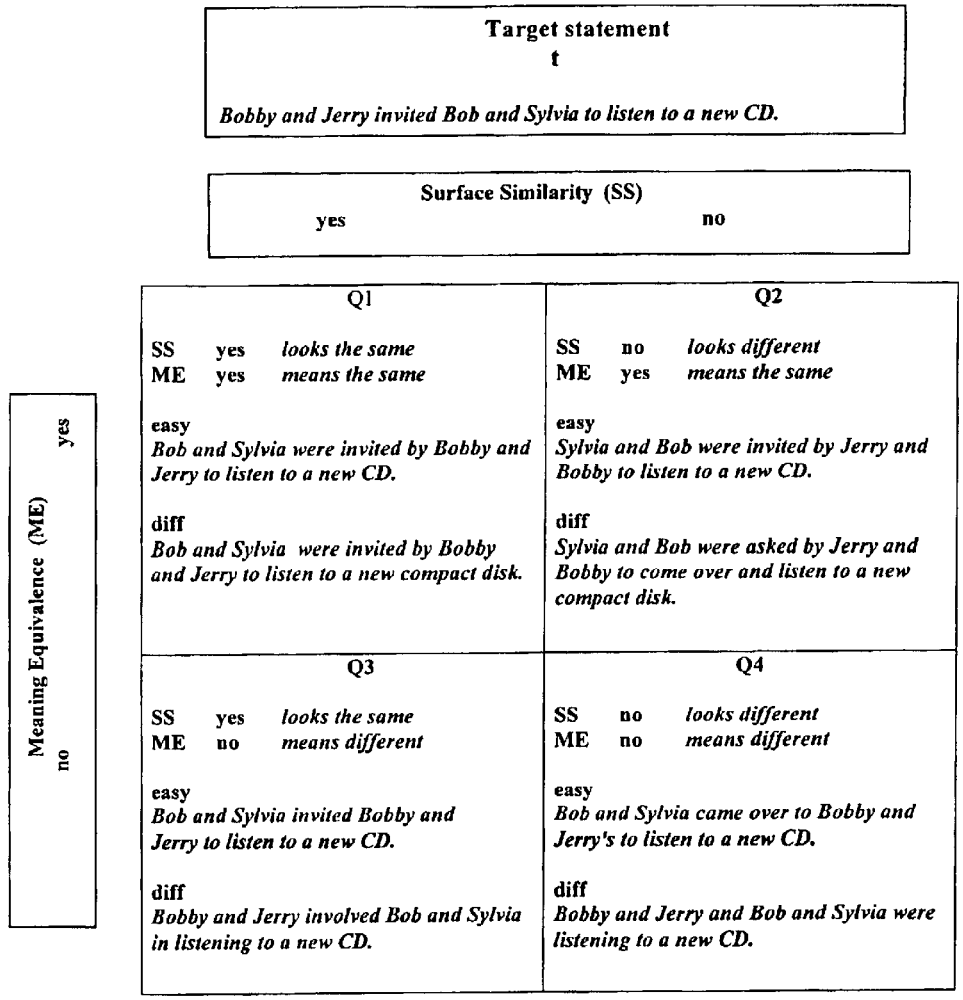
FIG. 11 is an example of an item family.

Referring to FIG. 11, an example of an item family with 2 statements per quadrant is shown for a meaning probe that tests for English text comprehension at the sentence level. In each quadrant there is an easy statement, labeled 'easy', and a more difficult statement, labeled 'diff'.

Constructing an Item from an Item Family

As an example, an item with five statements (i.e. a target statement and four test statements) will be constructed from an item family with nine components including 1 target statement t and two statements in each quadrant 1a, 1b, 2a, 2b, 3a, 3b, 4a and 4b (such as the item family shown in FIG. 11). Within each quadrant, the test statements marked with an 'a' are less difficult to analyze than the test statements marked with a 'b'. The item construction process involves the following steps:

a) compiling a list of 5 statements from the item family comprising the target statement t and 4 of the remaining 8 test statements; of these 4 test statements, at least one test statement must come from the quadrants Q1 or Q2 so that there is at least one test statement that has an equivalent meaning to the target statement t; and, b) randomizing the order of the 5 statements chosen in step a.

The specific choice of the 4 test statements, in addition to the compulsory target statement t, is dictated by the level of desired item difficulty. However, the choice may be dictated by other considerations as well.

For a given target statement t that encodes a concept, the construction of the various test statements in the item-family may be motivated by the desire to assess the comprehension of a certain feature of the concept embedded within the target statement t. Accordingly, the test statements may be constructed with this goal in mind. This idea is particularly useful for the construction of test statements that belong to the counter-intuitive quadrants Q2 and Q3.

Referring to Table 6, an example of an item which tests a student for text comprehension of English at the sentence level is shown. This item is based on the item family shown in FIG. 11.

TABLE 6

An example of an item for testing language.

| Statement # | Statement |
|---|---|
| 1 | Bob and Sylvia invited Bobby and Jerry to listen to a new CD. (Q3 - easy) |
| 2 | Bob and Sylvia came over to Bobby and Jerry's to listen to a new CD. (Q4 - easy) |
| 3 | Bob and Sylvia were invited by Bobby and Jerry to listen to a new CD. (Q1 - easy) |
| 4 | Bobby and Jerry and Bob and Sylvia were listening to a new CD. (Q4 - difficult) |
| 5 | Bobby and Jerry invited Bob and Sylvia to listen to a new CD. (target t) |

Creating a Meaning Probe and Testing a Student

To create a meaning probe, it is important to begin by carefully and accurately defining the subject area and the exact aspects of knowledge that are to be tested or probed for deep comprehension. In other words, a concept mapping of the subject area to be tested must be generated. This determination will drive the construction of the individual statements in the item families that will in turn define the eventual choices available for item construction. Once the items are constructed, the meaning probe is generated by selecting a number of items of desired difficulty.

The instructions in a typical meaning probe assessment for deep comprehension inform the student that each item in the test contains at least 2 statements (i.e. the target statement t and at least one test statement) that "mean the same thing". The task of the student is, for each item, to mark all statements that "mean the same thing". Unlike multiple-choice tests, with a meaning probe the student does not have a "meaning standard" to compare each statement to, i.e. the target statement t is unmarked. This feature prevents the instructors from teaching to the test. Since the target statement t is unmarked and appears as one of the 5 statements of an item it cannot be used to provide clues regarding 'surface similarity' or 'meaning equivalence'. Instead, the student has to construct, for each item, the underlying meaning on-the-fly. To do this successfully, the student must construct a tentative hypothesis regarding the meaning that is underlying the current item being looked at and then test each statement in the item for meaning equivalence against this hypothesis as well as against the 4 other statements. The items in the meaning probe should not have all statements from the quadrants Q1 and Q4 since this will make the meaning probe easy.

One example of an item that may be in a meaning probe is the example item that is shown in Table 6. The test instructions would be to select at least two sentences that mean the same thing. In this example, test statement 3 is a passive form of the target statement 5 and test statement 1 is misleading because the names of the people are switched.

Another type of item that may be in a meaning probe involves using a marked target statement and requesting the student to produce at least one Q2 and/or at least one Q3 statement. This is referred to as production item testing. An example of production item testing for concepts in molecular biology could be to have a marked target statement of: DNA synthesis is semiconservative, bidirectional, and initiates at specific sites. The test instructions may then be to construct two statements (a) and (b) which share equivalence-of-meaning with the target statement, but which look different than the target, and to construct two statements (c) and (d) which share surface similarity with the target statement, but which do not share meaning-equivalence with it.

Scoring the Meaning Probe

There are two reasons to construct scoring procedures which summarize the results of the meaning probe. The first reason is to provide the student with feedback. The second reason is to provide a detailed analysis regarding the student's deep comprehension of the conceptual content being tested so that the instructor can generate a follow-up instructional program to remedy specific misconceptions that the student may have. Scoring procedures which provide the student with feedback will be discussed in this section and test statistics for a more detailed analysis of the meaning probe results will be discussed in the following section.

There are four types of scoring procedures that may be used to provide feedback to the student following the completion of a meaning probe. These scoring procedures are referred to as the global, the item-specific, the item-by-meaning-equivalence specific, and the cross-sign-system specific scoring procedures.

The global feedback score is simply the score in terms of the number of items that were answered correctly. The student may receive a score of 1 for each item that was answered correctly and a score of 0 for each item that was answered incorrectly. An item is answered correctly when all statements, which have equivalent meaning, are correctly selected (i.e. identified) as having equivalent meaning and the remaining statements, which do not have equivalent meaning, are correctly left unselected (or unidentified).

The item-specific scoring procedure is a more refined score that allows the student to access each item to see which statements the student had marked as having meaning equivalence as well as the correct statements that had meaning equivalence. Accordingly, scoring for the item-specific scoring procedure comprises two partial scores for each item. The first partial score, for a given item, is the percentage of statements that were correctly selected by the student as having meaning equivalence (these are the target statement t and all Q1 and Q2 test statements included in the item). The second partial score, for a given item, is the percentage of statements that don't have meaning equivalence that were incorrectly selected by the student. For example, assume the statements for a given item are labeled 'a' through 'e' and the correct (i.e. meaning equivalence) statements are statements 'b', 'd' and 'e'. Next, assume that the student selected statements 'a', 'c' and 'e'. Accordingly, the student's first partial score would be 0.33 for correctly selecting statement 'e' or 1 out of the 3 meaning equivalence statements. The student's second partial score would be 1.00 for incorrectly selecting 2 of the 2 statements (i.e. statements 'a' and 'c') that do not encode equivalence-of-meaning. These two partial scores may be interpreted as two complementary indices of deep comprehension of the meaning encoded in a particular target statement t. These partial scores reveal the misunderstandings and misconceptions of the student regarding the meaning-equivalence underlying the particular item.

The item-by-meaning-equivalence specific scoring procedure comprises presenting the student with the statements selected by the student, the correct choices, and the two partial scores described above. This is done for each item. This information is presented on a 2×2 surface similarity by meaning equivalence matrix, much like that of FIG. 6 by placing each statement in its proper quadrant and identifying the target statement t. This detailed type of feedback provides the student with a complete analysis of his/her performance on each item and a concomitant opportunity to examine this analysis in great detail to learn from his/her mistakes. This analysis demonstrates to the student in clear, concise and concrete terms that deep comprehension requires a conscious effort to sort out deep meaning from surface similarity and that meaning equivalence is not rigidly yoked to surface similarity. This makes the item-by-meaning-equivalence specific feedback scoring procedure a natural step in remediation. The student receives not only specific feedback about what he/she knows, but also feedback about the areas where misconceptions exist and that need to be reinforced and learned.

The cross-sign-system specific scoring procedure involves calculating sub-scores separately for each pair of sign-systems that are used to convey meaning in the test statements in the various items of the meaning probe. For example, if the discipline is mathematics and the content is parts/whole relations, the following sign-systems may be used to convey meaning: Natural language (e.g., English), number words (for example "fifty-six"), arabic numerals, simple fractions, decimal numbers, percentage numbers (i.e. 5%), partially shaded images, collections of tokens of different colors, etc. Two of these sign systems, for example, may be selected and represented as sign systems A and B. In order to assess the student's ability to transcode meaning across the barrier demarcating sign systems A and B, the following procedure is followed. This procedure may be extended to any meaning probe for any subject area. Items in the meaning probe are constructed such that in one half of the items all the target statements as well as the test statements that originate from the quadrants Q1 and Q3 (and that therefore share surface similarity with the target statement t) are encoded in sign system A, and all statements that originate from the quadrants Q2 and Q4 (and that therefore do not share surface similarity with the target statement t) are encoded in sign system B. In the other half of the items, the roles of sign systems A and B are switched namely, target statements as well as statements that originate from the quadrants Q1 and Q3 are encoded in sign system B, and all statements that originate from the quadrants Q2 and Q4 are encoded in sign system A.

Comparative analysis of cumulative sub-scores by quadrant calculated separately for sign systems A and B provides information regarding the student's difficulties in traversing the barrier across sign systems A and B and provides cues for remediation. This method of assessment and of calculating sub-scores is particularly useful when assessing a student's acquisition of a second language B by a student whose first language is A.

Generating Test Statistics for Constructing an Instructional Follow-Up

In order to help the student remedy a problem incomprehension, it is important that the instructor has a good understanding of the details of misconceptions revealed by MEIM assessments, i.e., the specific mismatch between surface similarity and meaning equivalence, exhibited by the student in the specific content area that is the subject of the meaning probe. To become familiar with the specifics of such a mismatch for a particular student it may be beneficial to compute several partial scores. To compute these partial scores, the student's answer to a specific item may be treated as a binary response array of '1's and '0's in which a '1' symbolizes that a statement has been selected by the student and a '0' symbolizes that a statement has not been selected by the student. For example, if the student selected statements 'a'; 'c'; and 'e', the binary response array for that item would be '10101'. Scoring this item would then entail comparing this binary response array with the binary array of the correct response for this item. The partial scores can also be discussed in the context of using a 5-dimensional correct response array for each item comprising the labels of the quadrants in the SSME matrix from which each of the 4 test statements in the item came, i.e. Q1, Q2, Q3 and Q4 as well as t (i.e. the target statement). For example, if the correct response array for an item is 'Q3 t Q4 Q1 Q2', then statement 'a' in this item came from the quadrant Q3, statement 'b' is the target statement t, statement 'c' came from the quadrant Q4, etc. In this case the student should have checked statements 'b'; 'd'; and 'e', which correspond to t, Q1 and Q2 respectively.

The score tot_scr and the partial scores pos_scr, neg_scr, t_scr, Q1_scr, Q2_scr, Q3_scr and Q4_scr are now defined in the following equations. The rationale for computing these partial scores is that these scores allow the instructor to quickly identify areas in the student's response to the meaning probe, which tests a given conceptual content, which require attention since the partial scores identify specific performance aspects for various combinations of surface similarity and meaning equivalence.

tot_scr=the total number of items in the meaning probe with completely correct answers (i.e. in each of these items, the response binary array includes '1's for all target statements t and test statements from the quadrants Q1 and Q2 and '0's for all statements from the quadrants Q3 and Q4). (1)

pos_scr=the total number of correct selections in all items (i.e., the number of all selections corresponding to target statements t and test statements from the quadrants Q1 and Q2). (2)

neg_scr=the total number of incorrect selections in all items (i.e., the number of selections corresponding to test statements from the quadrants Q3 and Q4). (3)

t_scr=the total number of correct selections for target statements t in all items. (4)

$Q1$_scr=the total number of correct selections for test statements from the quadrant Q1 for all items. (5)

$Q2$_scr=the total number of correct selections for test statements from the quadrant Q2 in all items. (6)

$Q3$_scr=the total number of incorrect selections for test statements from the quadrant Q3 in all items. (7)

$Q4$_scr=the total number of incorrect selections for test statements from the quadrant Q4 in all items. (8)

In order to facilitate this diagnostic procedure, it may be preferable to calculate the proportion correct for each partial score, i.e. to divide each of the partial scores by the number of occurrences of the specific type of statement being measured in the partial score. For example, in a meaning probe with 10 items there are a total of 50 statements (i.e. 5 statements per item). Of these 50 statements, 10 of them are target statements since each item must contain a target statement. Accordingly, the other 40 test statements are distributed among the 4 quadrants Q1, Q2, Q3 and Q4 with the only constraint being that each item must include, in addition to a target statement t, at least one test statement with equivalence-of-meaning to the target statement t, i.e. at least one test statement from the quadrant Q1 or Q2. The equations for the proportion correct for each partial score are defined according to the following equations.

$$\text{pos\_pr} = \text{pos\_scr}/\text{num\_pos} \quad (9)$$

where pos_pr is the partial proportional positive score of the sum-total of all correctly selected target statements t and test statements from the quadrants Q1 and Q2 (which encode equivalence-of-meaning) divided by the total number of these statements (num_pos) in all items in the meaning probe.

$$\text{neg\_pr} = 1 - \text{neg\_scr}/\text{num\_neg} \quad (10)$$

where neg_pr is the partial proportional negative score of the sum-total of incorrectly selected test statements from the quadrants Q3 and Q4 (which do not encode equivalence-of-meaning) divided by the total number of these test statements (num_neg) in all items in the meaning probe.

$$\text{t\_pr} = \text{t\_scr}/\text{num\_t} \quad (11)$$

where t_pr is the sum of all correctly selected target statements t divided by the total number of target statements t (num_t);

$$Q1\_\text{pr} = Q1\_\text{scr}/\text{num\_}Q1 \quad (12)$$

where Q1_pr is the sum of all correctly selected test statements from the quadrant Q1 divided by the total number of test statements from the quadrant Q1 (num_Q1);

$$Q2\_pr = Q2\_scr/num\_Q2 \quad (13)$$

where Q2_pr is the sum of all correctly selected test statements from the quadrant Q2 divided by the total number of test statements from the quadrant Q2 (num_Q2);

$$Q3\_pr = 1 - Q3\_scr/num\_Q3 \quad (14)$$

where Q3_pr is the sum of all incorrectly selected test statements from the quadrant Q3 divided by the total number of test statements from the quadrant Q3 (num_Q3);

$$Q4\_pr = 1 - Q4\_scr/num\_Q4 \quad (15)$$

where Q4_pr is the sum of all incorrectly selected test statements from the quadrant Q4 divided by the total number of test statements from the quadrant Q4 (num_Q4);
with the constraint that the total number of statements in the meaning probe is equal to the sum of num_t, num_Q1, num_Q2, num_Q3 and num_Q4.

Based on meaning equivalence theory, students with incomplete knowledge, misconceptions, and shallow comprehension in the conceptual content that is the subject of the meaning probe should show depressed scores for statements from the misleading and counterintuitive quadrants Q2 and Q3 where there is a mismatch between surface similarity and meaning equivalence. In contrast, the students should have higher scores for test statements from the intuitive quadrants Q1 and Q4, as well as the score on the target statements t. This theoretical expectation is captured by the two composite scores RI_EX and RI_IN which are defined by equations (16) and (17):

$$RI\_EX = t\_pr - Q2\_pr \quad (16)$$

$$RI\_IN = t\_pr - Q3\_pr \quad (17)$$

The score RI_EX is the gap between the proportional scores for the target statements and for Q2 statements; i.e. this is a representational index of the extent to which the student excludes meaning-equivalence statements because they do not match the target statement t (or statements which come from the quadrant Q1) on the surface similarity dimension. The score RI_IN is the gap between the proportional scores for the target statements and for Q3 statements; i.e. this is a representational index of the extent to which the student includes non-meaning-equivalence statements because they match the target statement t (or test statements which come from the quadrant Q1) on the surface similarity dimension.

Controlling the Level of Item Difficulty

The level of difficulty associated with the meaning probe may be due to the nature of the target statement t, the number of test statements that are chosen from the quadrants Q1 and Q2, whether more test statements come from the quadrant Q1 than the quadrant Q2 and the number of test statements from the quadrant Q3. In particular, the target statement t comprises three main sources that may contribute to the level of difficulty for the meaning probe. These sources are the content and scope of the concept that is encoded in the target statement t, the nature of the representation of the concept in the target statement t and the working memory load of the target statement t.

The content and scope of the concept encoded in the target statement t may involve individual features of word-meaning or complex conditional concepts. Furthermore, testing the overall meaning of the concept or the comprehension of a particular feature of the concept may influence the difficulty of the meaning probe.

The nature of the representation of the concept, i.e. definitional versus situational, also affects the difficulty of the meaning probe. A definitional representation of the concept being probed involves describing abstract relations among concepts. These target statements may be more difficult to understand versus a situational representation of the concept being probed which describes a concrete situation involving the concept.

The working memory load is the number of independent pieces of information contained in the target statement t that the student must keep in mind while decoding the meaning of the target statement t. The student may operate well at 3–5 units of working-memory load yet may have great processing difficulties in situations where the working-memory load exceeds 7 units. Therefore, item-families anchored in target statements that have a working-memory load of 6 or 7 will, as a rule, generate items that are more difficult to decode for meaning-equivalence than item-families anchored in target statements that have a working-memory load of 3 or 4.

The difficulty of the meaning probe also depends on which quadrant, Q1 or Q2, the meaning equivalent test statements come from. Test statements from the quadrant Q1 share both surface similarity as well as meaning equivalence with the target statement t. However, the test statements from the quadrant Q4 are not identical to the target statement t in either surface features or in meaning since any change in the surface structure of a test statement will cause at least a slight change in meaning. One way to quantify this change in meaning is to look at the word-frequencies of the words used in the test statements (in terms of the English language, word frequency denotes how frequently these words are used in conversation or literature). This idea may be used recursively as more words are substituted in the target statement t to come up with the test statement from the quadrant Q1. Furthermore, the test statements from the quadrant Q2 should contribute more to the difficulty of the item than the test statements from the quadrant Q1 since the test statements from the quadrant Q2 do not share surface similarity with the target statement t and may include misleading cues.

The difficulty in the meaning probe may also result from test statements from the quadrant Q3. Since there must be at least two test statements with meaning equivalency, and in the example discussed here, a maximum of 5 statements, there may be up to three test statements that may come from the quadrant Q3. The test statements from the quadrant Q3 are especially difficult since they present misleading effects because these test statements look like the target statement t but do not have a meaning that is equivalent to that of the target statement t.

It should be kept in mind that each item in the meaning probe need not have the same number of statements as long as the statements satisfy the requirements of MEIM as described above. In addition, the statements for an item do not all have to incorporate either words, numbers or pictures; i.e. some items may have statements from a variety of sign systems. For instance, there may be an item with three language-based statements, one number-based statement and a picture-based statement with the target statement t being any one of these statements. In addition, other statistics may be used to evaluate the performance of the student on the meaning probe.

It should be understood that various modifications may be made to the preferred embodiments described and illustrated herein, without departing from the present invention, the scope of which is defined in the appended claims.

What is claimed is:

1. A method for testing a student on a computer in a given subject area, the method comprising the steps of:
    a) providing a Meaning Equivalence Instructional Methodology (MEIM) software program on the computer, the MEIM software program including a meaning probe module having a meaning probe that includes a plurality of items, wherein each item includes a target statement and several test statements wherein the target statement encodes a concept about the given subject area and for each item, the student must select at least two statements having the same meaning, the target statement being unmarked for at least some of the items;
    b) testing the student with the meaning probe in the given subject area by having the student select at least two statements having the same meaning for at least one of the items;
    c) scoring the meaning probe with a scoring module provided by the MEIM software program; and,
    d) providing feedback using a statistics module for computing statistics and a feedback module.

2. The method of claim 1, which includes providing an item generator module for providing each of the test statements with one of a similar appearance and a different appearance compared to the target statement.

3. The method of claim 2, which includes using the item generator module for providing each of the test statements with one of a similar meaning and a different meaning compared to the target statement.

4. The method of claim 1, which includes providing an item generator module for providing each of the test statements with one of a similar meaning and a different meaning compared to the target statement.

5. The method of claim 1, which includes providing an item generator module for providing at least one item family comprising the target statement and the plurality of test statements, and constructing at least one item from said at least one item family by selecting the target statement and some of the corresponding test statements.

6. The method of claim 5, which includes using the item generator module for providing each target statement as a text statement and providing at least one of the test statements having the same appearance and the same meaning as the target statement according to the steps of:
    e) identifying a verb in the target statement;
    f) looking or a lexical synonym for the verb; and,
    g) substituting the lexical synonym for the verb in the target statement to generate each such test statement from the target statement.

7. The method of claim 5, which includes using the item generator module for providing each target statement as a text statement and providing at least one of the test statements having the same appearance and the same meaning as the target statement according to the steps of:
    h) identifying a causative verb in the target statement; and,
    i) converting the voice of the causative verb from one of an active voice to a passive voice and passive voice to an active voice to generate each such test statement from the target statement.

8. The method of claim 5, which includes using the item generator module for providing each target statement as a text statement and providing at least one of the test statements having a different appearance and a similar meaning compared to the target statement, according to a heuristic method which comprises using different vocabulary to represent the concept of the target statement in each such text statement.

9. The method of claim 5, which includes using the item generator module for providing each target statement as a text statement and providing at least one of the test statements having a different appearance and a similar meaning compared to the target statement, according to a heuristic method which comprises using different syntactic structures to represent the concept of the target statement in each such test statement.

10. The method of claim 5, which includes using the item generator module for providing each target statement as a text statement and providing at least one of the test statements having a different appearance and a similar meaning compared to the target statement, according to a heuristic method which comprises using different grammatical structures to represent the concept of the target statement in each such test statement.

11. The method of claim 5, which includes using the item generator module for providing each target statement as a text statement and providing at least one of the test statements generated from the target statement by changing the order of the words in the target statement.

12. The method of claim 5, which includes using the item generator module for providing each target statement as a text statement and providing at least one test statement generated from the target statement by changing the punctuation in the target statement.

13. The method of claim 5, wherein the method further comprises storing item families in a database.

14. The method of claim 13, wherein the method further comprises adding new item families to the database to create a new database.

15. The method of claim 13, wherein the method further comprises providing a plurality of databases, wherein each of the databases contains concepts taught in a selected subject area.

16. The method of claim 13, wherein the method further comprises constructing each database to contain concepts taught in a textbook, for evaluating the student's comprehension of the textbook.

17. The method of claim 1, which includes using the meaning probe module for providing a generic template for the meaning probe and generating new meaning probes from the generic template.

18. The method of claim 1, which includes using the meaning probe module for generating the meaning probe to include:
    a first plurality of items in which each item uses a first sign system for said target statement and for each test statement having a surface similarity with the target statement; and,
    a second plurality of items in which each item uses a second sign system for said target statement and for each test statement having a surface similarity with the target statement.

19. The method of claim 1, which includes providing an item generator module for generating at least one item with a marked target statement and requesting the student to provide at least one statement that has a similar meaning and a different appearance compared to the marked target statement.

20. The method of claim 1, which includes providing an item generator module for generating at least one item with a marked target statement and requesting the student to provide at least one statement that has a similar appearance and a different meaning compared to the marked target statement.

21. The method of claim 1, wherein the method further includes using the meaning probe module for providing test statements belonging to only one of the following quadrants: Q1, Q2, Q3 and Q4 wherein test statements in quadrant Q1 have a similar appearance and a similar meaning compared to the target statement, test statements in quadrant Q2 have a different appearance and a similar meaning compared to the target statement, test statements in quadrant Q3 have a similar appearance and a different meaning compared to the target statement, and test statements in quadrant Q4 have a different appearance and a different meaning compared to the target statement.

22. The method of claim 21, wherein the method further includes using the scoring module for computing a global score comprising the total number of items in which the target statement the test statements in quadrants Q1 and Q2 were selected by the student in step (b), and none of the incorrect test statements in quadrants Q3 and Q4 were selected by the student.

23. The method of claim 21, wherein the method further includes using the scoring module for identifying the correct and incorrect statements selected by the student, the correct statement including the target statement and test statements in quadrants Q1 and Q2, the incorrect statements including the test statements in quadrants Q3 and Q4, wherein the scoring module scores the meaning probe by computing a first partial score and a second partial score for each item, wherein:

computing the first partial score includes totaling the number of correct statements selected by the student divided by the total number of correct statements for the item; and, computing the second partial score includes totaling the number of incorrect statements selected by the student divided, by the total number of incorrect statements for the item.

24. The method of claim 21, wherein the method further includes using the scoring module for:

j) identifying the correct and incorrect statements selected by the student, the correct statements including the target statement and test statements in quadrants Q1 and Q2, the incorrect statements including the test statements in quadrants Q3 and Q4;

k) computing a global score comprising the total number of items in which all of the correct statements were selected by the student and none of the incorrect statements were selected by the student; and, l) computing a first partial score and a second partial score for each item, wherein:

computing the first partial score comprises totaling the number of correct statements that were selected by the student divided by the total number of correct statements for the item; and, computing the second partial score comprises totaling the number of incorrect statements that were selected by the student divided by the total number of incorrect statements for the item.

25. The method of claim 21, which further includes using the scoring module for calculating RI_EX and RI_IN according to the formulas:

$$RI\_EX = t\_pr - Q2\_pr; \text{ and,}$$

$$RI\_IN = t\_pr - Q3\_pr;$$

where $t\_pr$ is the percentage of target statements in the meaning probe that were correctly selected by the student $Q2\_pr$ is the percentage of test statements in quadrant Q2 that were correctly selected by the student and $Q3\_pr$ is the percentage of test statements in quadrant Q3 that were incorrectly selected by the student.

26. The method of claim 21, which further includes using the scoring module for calculating several partial test scores including:

a partial target statement score which is the number of target statements selected by the student divided by the total number of target statements in the meaning probe;

a partial score of test statements in quadrant Q1 which is the number of correctly selected test statements from the quadrant Q1 divided by the total number of test statements from quadrant Q1 in the meaning probe;

a partial score of test statements in quadrant Q2 which is the number of correctly selected test statements from the quadrant Q2 divided by the total number of test statements from quadrant Q2 in the meaning probe;

a partial score of test statements in quadrant Q3 which is the number of incorrectly selected test statements from the quadrant Q3 divided by the total number of test statements from quadrant Q3 in the meaning probe; and, a partial core of test statements in quadrant Q4 which is the number of incorrectly selected test statements from the quadrant Q4 divided by the total number of test statements from quadrant Q4 in the meaning probe.

27. The system of claim 21, wherein the test statements belong to only one of the following quadrants: Q1, Q2, Q3 and Q4 wherein test statements in quadrant Q1 have a similar appearance and a similar meaning compared to the target statement, test statements in quadrant Q2 have a different appearance and a similar meaning compared to the target statement, test statements in quadrant Q3 have a similar appearance and a different meaning compared to the target statement, and test statements in quadrant Q4 have a different appearance and a different meaning compared to the target statement.

28. The system of claim 27, wherein the scoring module is adapted to score the meaning probe by computing a global score comprising the total number of items in which the target statement and the test statements in quadrants Q1 and Q2 were selected by the student and none of the incorrect test statements in quadrants Q3 and Q4 were selected by the student.

29. The system of claim 27, wherein the scoring module is adapted to identify the correct and incorrect statements selected by the student, the correct statements including the target statement test and test statements in quadrants Q1 and Q2, the incorrect statements including the test statements in quadrants Q3 and Q4, and wherein the scoring module is adapted to score the meaning probe by computing a first partial score and a second partial score for each item, wherein, computing the first partial score includes totaling the number of correct statements selected by the student divided by the total number of correct statements for the item; and, computing the second partial score includes totaling the number of incorrect statements selected by the student divided by the total number of incorrect statements for the item.

30. The system of claim 27, wherein the scoring module is adapted for:
   e) identifying the correct and incorrect statements selected by the student, the correct statements including the target statement and test statements in quadrants Q1 and Q2, the incorrect statements including the test statements in quadrants Q3 and Q4;
   f) computing a global score comprising the total number of items in which all of the correct statements were selected by the student and none of the incorrect statements were selected by the student; and,
   g) computing a first partial score and a second partial score for each item, wherein computing the first partial score comprises totaling the number of correct statements that were selected by the student divided by the total number of correct statements for the item and, computing the second partial score comprises totaling the number of incorrect statements that were selected by the student divided by the total number of incorrect statements for the item.

31. The system of claim 27, wherein the scoring module is adapted to score the meaning probe by calculating RI_EX and RI_IN according to the formulas:

$$RI\_EX = t\_pr - Q2\_pr;\ \text{and,}$$

$$RI\_IN = t\_pr - Q3\_pr;$$

where t_pr is the percentage of target statements the meaning probe that were correctly selected by the at dent, Q2_pr is the percentage of test statements in quadrant Q2 that were correctly selected by the student and Q3_pr is the percentage of test statements in quadrant Q3 that were incorrectly selected by the student.

32. The system of claim 27, wherein the scoring module is adapted to score the meaning probe by calculating several partial test scores including:
   a partial target statement score which is the number of target statements selected by the student divided by the total number of target statements in the meaning probe;
   a partial score of test statements in quadrant Q1 which is the number of correctly selected test statements from the quadrant Q1 divided by the total number of test statements from quadrant Q1 in the meaning probe;
   a partial score of test statements in quadrant Q2 which is the number of correctly selected test statements from the quadrant Q2 divided by the total number of test statements from quadrant Q2 in the meaning probe;
   a partial score of test statements in quadrant Q3 which is the number of incorrectly selected statements from the quadrant Q3 divided by the total number of test statements from quadrant Q3 in the meaning probe; and,
   a partial score of test statements in quadrant Q4 which is the number of incorrectly selected statements from the quadrant Q4 divided by the total number of test statements from quadrant Q4 in the meaning probe.

33. A system for testing a student in a given subject area, the system comprising:
   a) a computer having a Meaning Equivalence Instructional Methodology (MEIM) software program, the MEIM software program including:
      i) a meaning probe module for testing the student with a meaning probe in the subject area;
      ii) a scoring module for scoring the meaning probe;
      iii) a statistics module for computing statistics; and,
      iv) a feedback module for providing feedback, wherein, the meaning, scoring, statistics and feedback modules are interconnected, and wherein, the meaning probe has a list of items and each item includes a target statement and several test statements wherein the target statement encodes a concept about the subject area being tested and for each item, the student must select at least two statements having the same meaning and the target statement is unmarked for at least some of the items.

34. The system of claim 33, wherein the MEIM software program further comprises an item generator module for generating the items, a MEIM main module for controlling the operation of the software program, a master database and a database authoring module, wherein the MEIM main module is connected to the item generator module, the master database and the database authoring module and wherein the master database comprises a plurality of individual databases, each individual database comprising item families that are adapted for use by the item generator module to generate items.

35. The system of claim 34, wherein the database authoring module is adapted to create new individual databases and augment already existing individual databases by adding new item families to the already existing individual databases.

36. The system of claim 34, wherein the item generator module is adapted to create at least one item from item families wherein each item family comprises the target statement and the plurality of test statements and constructing said at least one item from an item family is effected by selecting the target statement and some of the corresponding test statements from the item family.

37. The system of claim 33, wherein the system further comprises an email program connected to the MEIM software program, a printer, an input device and a computer monitor, wherein the printer, input device and computer monitor are connected to the computer and wherein the student interacts with the MEIM software program through the input device and the computer monitor.

38. The system of claim 33, wherein each of the test statements has one of a similar appearance and a different appearance compared to the target statement.

39. The system of claim 33, wherein each of the test statements has one of a similar meaning and a different meaning compared to the target statement.

40. The system of claim 33, wherein the meaning probe comprises:
   a first plurality of items in which each item uses a first sign system for said target statement and for each test statement having a surface similarity with the target statement; and,
   a second plurality of items in which each item uses a second sign system for said target statement and for each test statement having a surface similarity with the target statement.

41. The system of claim 33, wherein at least one item comprises a market target statement and the student must provide at least one statement that has a similar meaning and a different appearance compared to the marked target statement.

42. The system of claim 33, wherein at least one item comprises a marked target statement and the student must provide at least one statement that has a similar appearance and a different meaning compared to the marked target statement.

43. A system for testing a student in a given subject area, the system comprising:
   (a) a computer having a Meaning Equivalence Instructional Methodology (MEIM) software program, the MEIM software program including:
      (i) a meaning probe module for testing the student with a meaning probe in a subject area;
      (ii) a scoring module for scoring the meaning probe;
      (iii) a statistics module for computing statistics; and,
      (iv) a feedback module for providing feedback to the student;
   wherein, the meaning scoring, statistics and feedback modules are interconnected, and
wherein, the meaning probe has a list of items and each item includes a target statement and several test statements wherein the target statement encodes a concept about the subject area being tested, and each test statement belongs to only one of the following quadrants: Q1, Q2, Q3, and Q4; wherein test statements in Q1 have a similar appearance and a similar meaning compared to the target statement, test statements in Q2 have a different appearance and a similar meaning compared to the target statement, test statements in Q3 have a similar appearance and a different meaning compared to the target statement, and test statement in Q4 have a different appearance and a different meaning compared to the target statement.

* * * * *

UNITED STATES PATENT AND TRADEMARK OFFICE
CERTIFICATE OF CORRECTION

| | | |
|---|---|---|
| PATENT NO. | : 6,953,344 B2 | Page 1 of 3 |
| DATED | : October 11, 2005 | |
| INVENTOR(S) | : Uri Shafrir | |

It is certified that error appears in the above-identified patent and that said Letters Patent is hereby corrected as shown below:

Column 6,
Line 20, should read -- The MEIM main module 32 generates a meaning probe by invoking the item generator module 36 to create a list of items (i.e. questions) --.

Column 9,
Lines 37 and 38, should read -- Meaning Equivalence Instructional Methodology (MEIM) Theory --.

Column 10,
Line 21, should read -- same words in substantially the same order. For instance, the --.

Column 11,
Line 33, should read -- ing equivalence compared to the target statement t. The test --.
Line 36, should read -- ment t --.
Line 55, should read -- quadrants Q2 and Q3 is counterintuitive and misleading. --.
Line 64, should read -- ment. Contrastingly, the test statements (e), (f), and (g) may --.

Column 12,
Line 32, should read -- test statements in Q3 (i.e. statements (e), (f) and (g)) are --.

Column 13,
Line 39, should read -- erating a test statement for the quadrant Q2 based on a target --.
Line 48, should read -- Target         Black-faced type of sheep prefer to stand beside one --.

Column 14,
Line 35, should read -- Constructing item-families --.

Column 15,
Line 22, should read -- constraints on the level of difficult that may be embedded --.

Column 16,
Line 14, should read -- Constructing an Item from an Item Family --.
Line 63, should read -- Creating a Meaning Probe and Testing a Student --.

Column 17,
Line 48, should read -- Scoring the Meaning Probe --.
Line 66, should read -- The global feedback score is simply the score in terms of --.

UNITED STATES PATENT AND TRADEMARK OFFICE
CERTIFICATE OF CORRECTION

PATENT NO. : 6,953,344 B2
DATED : October 11, 2005
INVENTOR(S) : Uri Shafrir

It is certified that error appears in the above-identified patent and that said Letters Patent is hereby corrected as shown below:

Column 18,
Line 8, should read -- The item-specific scoring procedure is a more refined --.
Lines 36 and 37, should read -- The item-by-meaning-equivalence specific scoring procedure comprises presenting the student with the statements --.
Line 57, should read -- The cross-sign-system specific scoring procedure --.

Column 19,
Lines 6 and 7, should read -- in the meaning probe are constructed such that in *one half of the items* all the target statements as well as the test --.
Line 13, should read -- are encoded in sign system B. In the *other half of the items*, --.
Lines 28 and 29, should read -- Generating Test Statistics for Constructing an Instructional Follow-Up --.
Line 31, should read -- in comprehension, it is important that the instructor has a --.

Column 21,
Line 58, should read -- Controlling the Level of Item Difficulty --.

Column 23,
Line 55, should read -- f) looking for a lexical synonym for the verb; and, --.

Column 25,
Line 25, should read -- target statement and the test statements in quadrants Q1 and Q2 --.
Line 32, should read -- statements including the target statement and test statements --.
Line 44, should read -- divided by the total number of incorrect statements for --.

Column 26,
Line 9, should read -- meaning probe that were correctly selected by the student, --.
Line 34, should read -- a partial score of test statements in quadrant Q4 which is --.
Line 59, should read -- target statement and test statements in quadrants Q1 and --.

Column 27,
Line 32, should read -- where $t\_pr$ is the percentage of target statements in the mean- --.
Line 33, should read -- ing probe that were correctly selected by the student, $Q2\_pr$ --.
Lines 54 and 58, should read -- the number of incorrectly selected test statements from the --.
Line 59, should read -- comprises a marked target statement and the student must --.

Column 28,
Line 59, should read -- comprises a marked target statement and the student must --.

UNITED STATES PATENT AND TRADEMARK OFFICE
CERTIFICATE OF CORRECTION

PATENT NO. : 6,953,344 B2
DATED : October 11, 2005
INVENTOR(S) : Uri Shafrir

It is certified that error appears in the above-identified patent and that said Letters Patent is hereby corrected as shown below:

Column 29,
Line 12, should read -- wherein, the meaning, scoring, statistics and feedback --.

Column 30,
Line 10, should read -- compared to the target statement, and test statements in Q4 --.

Signed and Sealed this

Twenty-first Day of March, 2006

JON W. DUDAS
*Director of the United States Patent and Trademark Office*